United States Patent [19]

Pecoraro

[11] 4,360,373
[45] Nov. 23, 1982

[54] METHOD OF AND APPARATUS FOR CONTROLLING EROSION OF A REFRACTORY THRESHOLD

[75] Inventor: George A. Pecoraro, Lower Burrell, Pa.

[73] Assignee: PPG Industries, Inc., Pittsburgh, Pa.

[21] Appl. No.: 250,500

[22] Filed: Apr. 2, 1981

[51] Int. Cl.³ ............................................ C03B 18/16
[52] U.S. Cl. .................................... 65/99.2; 65/99.3; 65/182.5
[58] Field of Search ................... 65/99 A, 182.5, 99.2, 65/99.3

[56] References Cited

U.S. PATENT DOCUMENTS

| 3,351,452 | 11/1967 | Robinson | 65/182 |
|---|---|---|---|
| 3,442,636 | 5/1969 | Kita et al. | 65/182 |
| 3,589,886 | 6/1971 | Montgomery | 65/182 |
| 3,655,356 | 4/1972 | Javaux | 65/182.5 |
| 3,854,922 | 12/1975 | Sensi et al. | 65/172 |
| 3,884,665 | 5/1975 | Edge et al. | 65/99 A |
| 3,898,069 | 8/1975 | Cerutti et al. | 65/182 R |
| 3,926,605 | 12/1975 | Kunkle | 65/65 A |
| 4,062,666 | 12/1977 | Tilton | 65/99 A |
| 4,065,285 | 12/1977 | Pecoraro | 65/182 R |
| 4,115,092 | 9/1978 | Neely, Jr. | 65/182.5 X |
| 4,116,660 | 9/1978 | Zortea | 65/99 A |
| 4,188,200 | 2/1980 | Horn | 65/90 |

Primary Examiner—Arthur D. Kellogg
Attorney, Agent, or Firm—Dennis G. Millman; Lee Patch

[57] ABSTRACT

A method of controlling the erosion of a refractory threshold over which molten glass flows transverse to the longitudinal centerline thereof, which includes preferentially cooling the central portion of the threshold while maintaining the marginal edge portions at a temperature above the liquidus temperature of the molten glass. A cooling fluid conduit extending longitudinally through the refractory threshold is thermally insulated adjacent its end portions, thereby localizing the cooling effect towards the central portion of the threshold.

9 Claims, 5 Drawing Figures

METHOD OF AND APPARATUS FOR CONTROLLING EROSION OF A REFRACTORY THRESHOLD

BACKGROUND OF THE INVENTION

Field of the Invention

The present invention relates to the manufacture of flat glass wherein a stream of molten glass is delivered over a refractory surface onto the surface of a pool of molten metal. More particularly, the invention relates to a method of and apparatus for delivering a stream of molten glass onto the surface of a pool of molten metal, wherein the refractory surface, or threshold, is selectively cooled during glass delivery to control threshold erosion to prolong threshold life.

Discussion of the Technical Problem

It is known that molten glass can be delivered onto molten metal and thereafter formed into a continuous ribbon by a process commonly referred to as the float process. Generally a stream of molten glass is delivered from a glass making furnace over a refractory, glass-supporting element, usually referred to as a threshold, onto the surface of the molten metal pool in the forming chamber.

Suitable glass delivery facilities include those taught in U.S. Pat. Nos. 3,854,922; 3,884,665; 3,898,069; and 4,062,666.

U.S. Pat. No. 3,854,922 to Sensi and Wehner generally teaches a glass delivery apparatus in which a refractory threshold is mounted over the front basin wall of a glassmaking furnace and serves as a common wall between the furnace and the glass forming chamber to provide a support surface over which a stream of glass may be delivered for forming. Side members or jambs extend upwardly at the ends of the threshold and a metering member or tweel extends transversely across the delivery facility in substantial alignment with the threshold. The tweel, side members and threshold define an opening through which molten glass is delivered. Cooling fluid is passed through pipes which extend lengthwise through the threshold transverse to glass flow. In a preferred embodiment cooling fluid is also passed through a hollow structural member upon which the threshold rests.

U.S. Pat. No. 3,884,665 to Edge and Kunkle generally teaches a refractory threshold having an upwardly facing convex glass supporting surface and further discloses cooling or heating of the threshold by the use of cooling pipes or resistance heating elements, respectively, which extend lengthwise therethrough.

U.S. Pat. No. 3,898,069 to Cerutti and Gulotta generally teaches a refractory threshold having an impervious, generally L-shaped member extending lengthwise through the threshold through which cooling fluid is passed.

U.S. Pat. No. 4,062,666 to Tilton generally teaches a refractory threshold having a vertical cooler, casing coolers, and internal pipe coolers extending lengthwise beneath it and through it.

While all of the above discussed patents teach delivery facilities which may be advantageously employed, none address the problem of non-uniform threshold erosion. It has been determined that the glass supporting surface of a refractory threshold generally exhibits nonuniform erosion characteristics after prolonged usage. Such a condition is undesirable, for it alters glass flow characteristics and leads to shortened threshold life.

U.S. Pat. No. 4,116,660 to Zortea teaches a flat glass forming method which includes facilities for adjusting the temperature of a stream of molten glass longitudinally and crosswise during its flow along an overflow chute prior to arrival at a metallic bath. The overflow chute and a connecting member are provided with thermal conditioning means which make it possible to maintain them at average given temperatures and to adjust the temperatures in the central zone and the marginal zones of the glass independently to adjust and homogenize the glass flow. The subject patent does not address the problem of nonuniform threshold erosion, however. It would be advantageous to have a method of and an apparatus for diminishing or eliminating nonuniform threshold erosion.

SUMMARY OF THE INVENTION

It is believed that nonuniform threshold wear is generally caused by the nonuniform transverse temperature and velocity profile of the stream of molten glass which the threshold supports. Generally, the stream of molten glass which flows over the threshold has a higher temperature and velocity in its central portions than adjacent its marginal edge portions. Both higher operating temperatures and increased flow velocities contribute to the accelerated erosion of the central portion of the threshold.

The present invention provides a method of controlling the erosion of a refractory threshold used in the delivery of a stream of molten glass from a glass making furnace to a glass forming chamber. The improvement includes the step of selectively cooling the refractory threshold along its direction transverse to the flow of the glass stream, preferably such that the central portion of the refractory threshold is cooled an amount in excess of the cooling applied to the marginal edge portions. Such selective cooling may be practiced to establish a substantially uniform temperature profile along the length of the refractory threshold. Alternatively, selective cooling may be practiced to establish a central portion operating temperature which is less than the marginal edge portion operating temperature of the refractory threshold. In this manner the erosion of the central portion of the refractory threshold is diminished with respect to the erosion of the marginal edge portions, thereby providing a flatter profile and increased life span for the threshold.

The present invention generally provides a method of controlling threshold erosion which includes the step of cooling the central portion of the threshold to a central portion operating temperature which is less than the central region glass temperature by an amount which exceeds the amount by which the average marginal edge portion operating temperature is less than the marginal edge portion glass temperature. In the preferred practice of the invention the central portion operating temperature is about equal to or may be less than the marginal edge portion operating temperature. Practice of the invention diminishes undesirable advanced erosion in the central portion of the refractory threshold, and further tends to flatten the transverse temperature profile of the stream of molten glass flowing thereover.

The present invention further provides apparatus for controlling the erosion of a refractory threshold, including facilities for selectively cooling the refractory threshold along its direction transverse to the flow of the stream of molten glass. The facilities preferably include means for cooling the central portions of the refractory threshold at a rate greater than the cooling at the marginal edge portions of the refractory threshold.

In one embodiment of the invention the refractory threshold is provided with an elongated refractory body portion having at least one cavity extending lengthwise therethrough, a conduit within the cavity, facilities for passing cooling fluid through the conduit, and facilities for thermally insulating portions of the conduit from the body portion of the refractory threshold.

DESCRIPTION OF THE INVENTION

Figure 1:
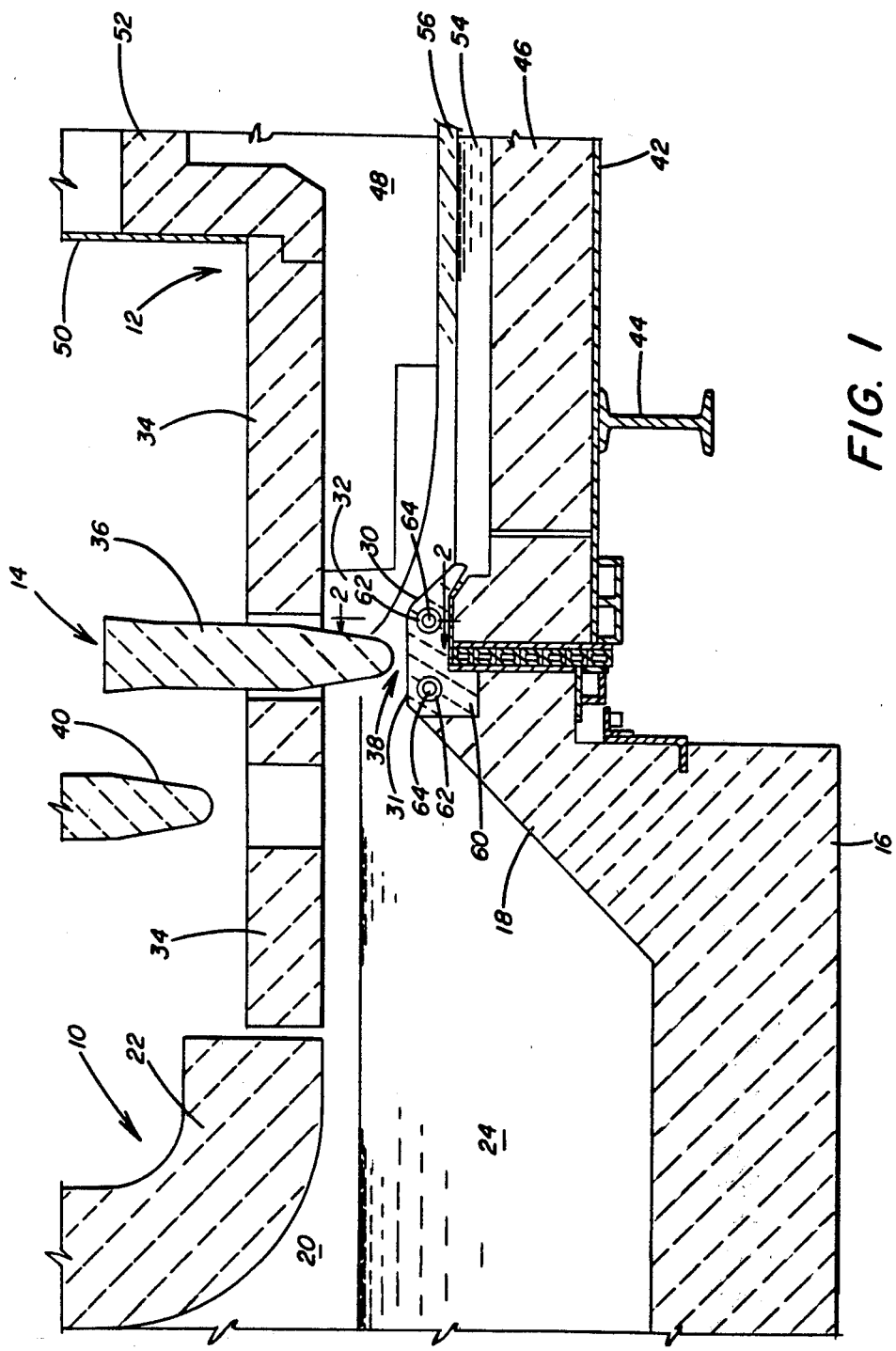
FIG. 1 is a longitudinal sectional elevational side view of a delivery facility connecting the glass conditioner of a glassmaking furnace to a glass forming chamber.

Referring to FIG. 1, there is shown an apparatus for making flat glass, including a refiner or conditioner region 10 of a glassmaking furnace and a glass forming chamber 12 (partially shown), joined together by a molten glass delivery facility 14. At its refiner or conditioner region 10, the glassmaking furnace includes a refractory bottom 16, an inclined front basin wall 18, and sidewalls 20. Additionally the conditioner region 10 includes an upper or suspended front wall 22. Contained within the glassmaking furnace is a pool of molten glass 24. Preferably, although not limiting to the invention, the furnace structure utilized in the practice of the present invention is that which is taught in U.S. Pat. No. 3,884,665 to Edge and Kunkle, which is hereby incorporated by reference.

The molten glass delivery facility 14 includes a threshold assembly 30, which will be described more fully below. Also included are sidemembers or jambs 32 which extend upwardly from the ends of the threshold assembly 30. The jambs 32 define the marginal walls of an opening through which molten glass may be delivered for forming within the forming chamber 12. Extending over the delivery facility 14, a portion of the conditioner region 10, and a portion of the forming chamber 12 are roof sections or flat arches 34.

A metering member or tweel 36 extends downwardly through the flat arch 34 over the threshold assembly 30. This tweel 36 is mounted by mounting means (not shown) for raising or lowering the tweel 36 to control the size of the molten glass delivery opening 38 which is defined by the bottom of the tweel 36, the top surface 31 of the threshold assembly 30, and the interior faces of the jambs 32. Upstream of the tweel 36 is mounted a backup tweel 40 which may be used as a control tweel when repair or maintenance is needed on the tweel 36. The backup tweel 40 may be used to completely shut off the flow of molten glass to the area of the tweel 36 in the event major maintenance of the delivery facility 14 or forming chamber 12 is to be accomplished.

The forming chamber 12 includes a bottom casing 42 which is a substantially impervious, open-topped container constructed of steel plate or the like. The bottom casing 42 rests on structural members, e.g., beam 44. Positioned inside the bottom casing 42 is a bottom refractory liner 46, and extending upwardly along the inside of the casing sidewalls are side wall refractory liners 48. An upper casing 50 and a refractory roof 52 join to the flat arch 34 to provide a headspace above the pool of molten metal 54, e.g., tin, which is contained within the bottom liner 46 and the bottom portion of the side liners 48.

During operation, a stream of molten glass is discharged from the pool of molten glass 24 contained in conditioner region 10 and caused to flow over the threshold assembly 30, through the delivery opening 38 and onto the pool of molten metal 54 contained within the forming chamber 12. The delivered stream of molten glass advances as a ribbon 56 along the surface of the pool of molten metal 54. As it advances through the forming chamber 12, it is cooled and forces are applied to it to form a dimensionally stable continuous ribbon of glass which is ultimately withdrawn from the forming chamber 12 for further treatment such as annealing.

Figure 2:
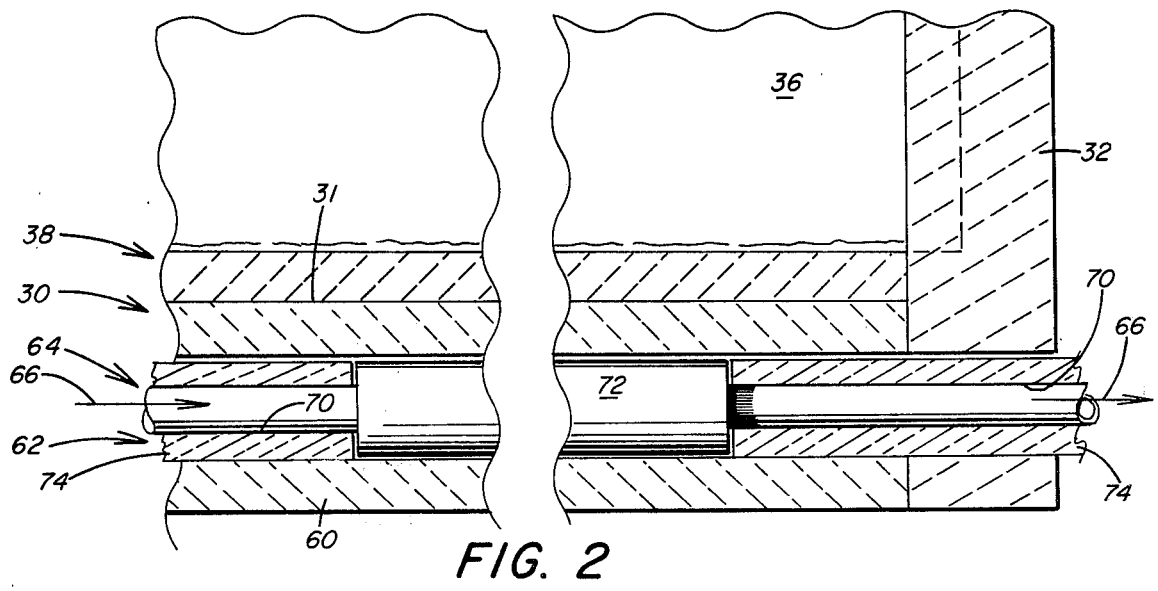
FIG. 2 is a sectional view taken along line 2—2 of FIG. 1, illustrating selective threshold cooling facilities in accordance with the present invention.

The threshold assembly 30 generally defines an upraised bridgewall over which the stream of molten glass flows in a direction transverse to the longitudinal centerline of the threshold 30 during its delivery from the conditioner region 10 to the forming chamber 12. With reference to FIGS. 1 and 2, the threshold assembly 30 includes an elongated refractory body portion 60 extending between jambs 32, having a plurality, e.g., two, cavities 62 extending longitudinally therethrough. Mounted within cavities 62 are elongated conduits 64 through which cooling fluid may be passed in the direction of arrows 66 to cool the refractory body portion 60.

The refractory body portion 60 is generally formed of one or a plurality of refractory members which are compatible with the hostile environment present at the delivery facility 14. Preferably the refractory body portion 60 is formed of clear fused quartz, a material which is resistant to the corrosive and erosive effects of molten glass flow. The threshold assembly 30 may be generally constructed in conformance with the teachings of U.S. Pat. Nos. 3,854,922; 3,884,665; 3,898,069; or preferably 4,062,666 which teachings are hereby incorporated by reference.

Prior to the present invention, the glass supporting surface 31 of the refractory body portion 60 exhibited tendencies to erode during usage in a nonuniform manner. In particular, the central portion of the supporting surface 31 tended to erode more rapidly than the marginal edge portions. This nonuniform wear is believed to be due to transverse temperature and velocity nonuniformities which exist in the stream of molten glass flowing thereover. Generally, the marginal edge portions of the pool of molten glass 24 contained within the conditioner region 10 lose heat through the sidewalls 20 as a faster rate than does the central portion of the pool 24. Thus, the stream of molten glass which is delivered through the glass delivery opening 38 generally is hotter in its central region and cooler at its marginal edge portions. This temperature nonuniformity generally produces a nonuniformity in flow velocity, due to the lower viscosity of the central portion and its correspondingly increased tendency to flow. Moreover, flow velocity of the marginal edge portions of the stream of molten glass is further decreased by viscous drag occasioned by contact with the jambs 32 and any buildup of devitrified material which may accumulate therealong. The result is a condition in which the central portion of the supporting surface 31 of the threshold assembly 30 is eroded at an accelerated rate, when compared to the marginal edge portions thereof, thereby producing a concave configuration on the supporting surface 31. Such a concave configuration permits greater glass flow through the central region, thereby accelerating the undesirable condition, and eventually requiring costly threshold assembly replacement.

The concave configuration of the supporting surface 31 further requires that the lower surface of the tweel 36 be modified during a glassmaking campaign to a more convex configuration to compensate for increased glass flow through the central portions of the glass delivery opening 38.

With continued reference to FIGS. 1 and 2, the present invention provides a method of an apparatus for diminishing or eliminating nonuniform erosion of the supporting surface 31, by selectively cooling the threshold assembly 30 along its direction transverse to the flow of molten glass. As can be now appreciated from the previous discussion, preferably the central portions of the threshold assembly 30 are cooled an amount in excess of the cooling of the marginal edge portions thereof. In FIG. 2 there is shown a generally cylindrical conduit 64 within cavity 62 having end portions 70 of a relatively small diameter oriented adjacent the marginal edge portions of the threshold assembly 30. Between the relatively small diameter end portions 70 is a relatively large diameter central portion 72. Thermal insulating sleeves 74 are positioned about the relatively small diameter end portions 70 within the cavity 62 to thermally insulate the end portions 70 from the marginal edge portions of the refractory body 60 of the threshold assembly 30. Cooling fluid is passed through the conduit 64 in the direction of arrows 66. The insulating sleeves 74 shield the marginal edge portions of the threshold assembly 30 from the cooling effects of the cooling fluid passage, and the relatively large diameter central portion 72 of conduit 64 permits effective communication between the central portion of the refractory body 60 and the effects of the cooling fluid passage. In this manner the central portion is preferentially cooled to diminish erosion of the supporting surface 31 in the central region of the threshold assembly 30.

Although not limiting to the invention, the conduit 64 may be formed of sections of interconnected stainless steel conduits, preferably about ¾ inch (1.9 cm) diameter conduit for the central portion 72 and about ½ inch (1.27 cm) diameter conduit for the end portions 70.

The thermal insulating sleeves 74 may be formed of any convenient highly insulating material, e.g., from a ceramic fiber paper such as Fiberfrax Paper 970-J available from the Carborundum Company of Rochester, New York. In a preferred embodiment, such Fiberfrax Paper 970-J is formed into a ¼ inch (0.6 cm) thick sleeve 74.

Figure 3:
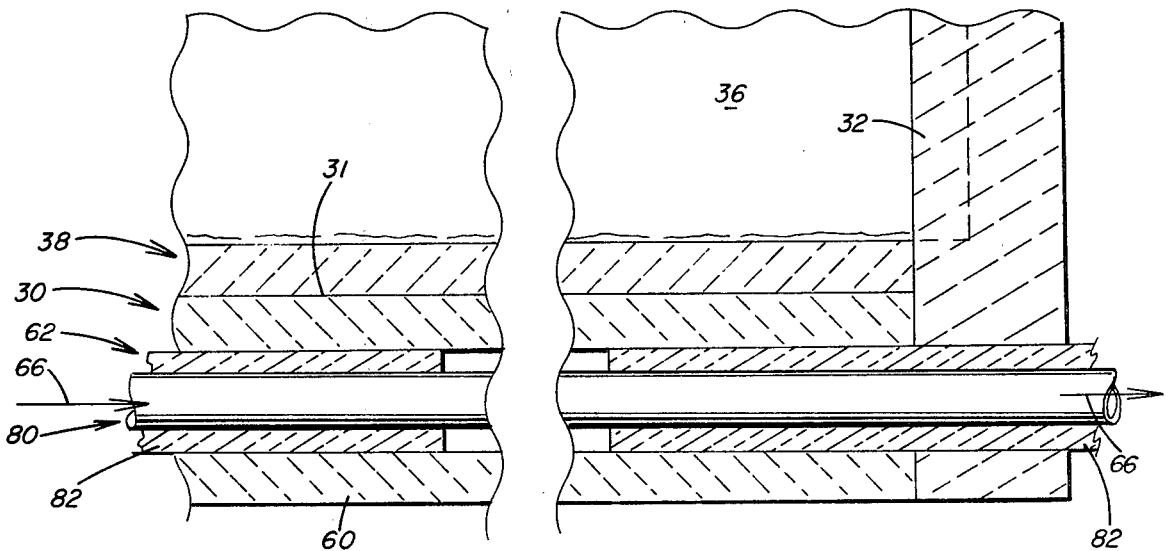
FIG. 3 is a view similar to FIG. 2 illustrating an alternate embodiment of the present invention.

Referring to FIG. 3, there is shown an alternate embodiment of the present invention, wherein a generally cylindrical conduit 80 having an outer diameter less than the inner diameter of the cavity 62 is centrally oriented therein. A pair of thermal insulating sleeves 82 are positioned about the end portions of the conduit 80. The sleeves 82 are movably mounted with respect to the conduit 80 such that they may be conveniently moved into and out of the cavity 62 during operation to alter the degree to which the central portion of the threshold assembly 30 is preferentially cooled with respect to the cooling of the marginal edge portions.

Figure 4:
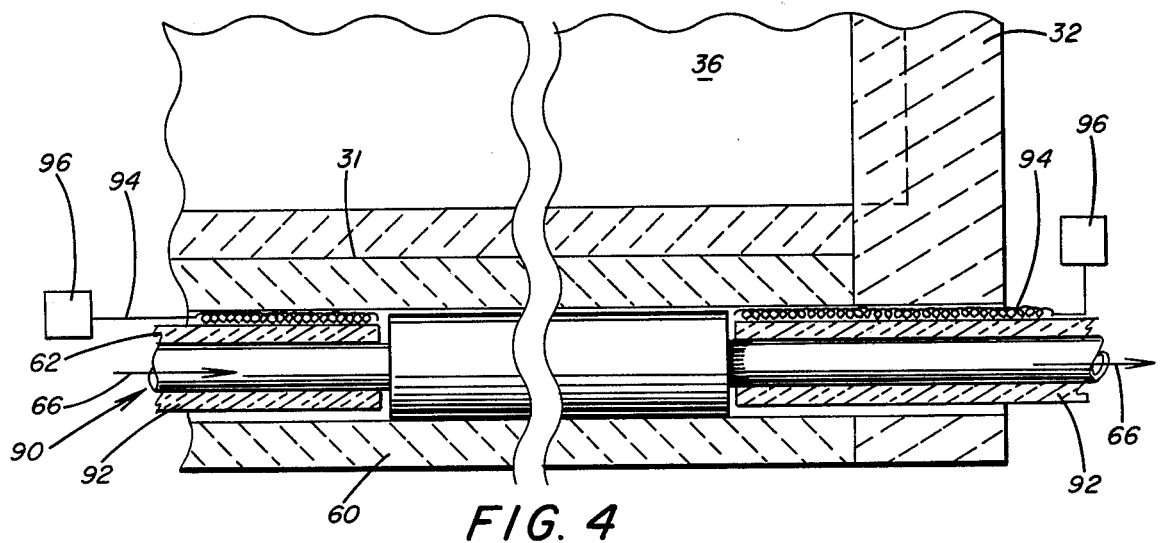
FIG. 4 is a view similar to FIG. 2 illustrating a further embodiment of the present invention.

Referring to FIG. 4, there is shown a further embodiment of the present invention, wherein a conduit 90 (similar to conduit 64 in FIG. 2) is oriented within the cavity 62, thermal insulating sleeves 92 are positioned about the smaller diameter end portions thereof, and a pair of heating elements 94 are positioned within the cavity 62 adjacent the marginal edge portions of the refractory body 60 and energized by power sources 96. Heating elements 94 may be electrical resistance heating elements, or any other type known in the art. In this embodiment, the central portions of the threshold assembly 30 may be preferentially cooled, while the marginal edge portions may be heated. Such a technique may be preferable to provide substantial center cooling while maintaining marginal edge portions at a temperature greater than the liquidus temperature of the glass, a consideration which will be more fully discussed below.

Figure 5:
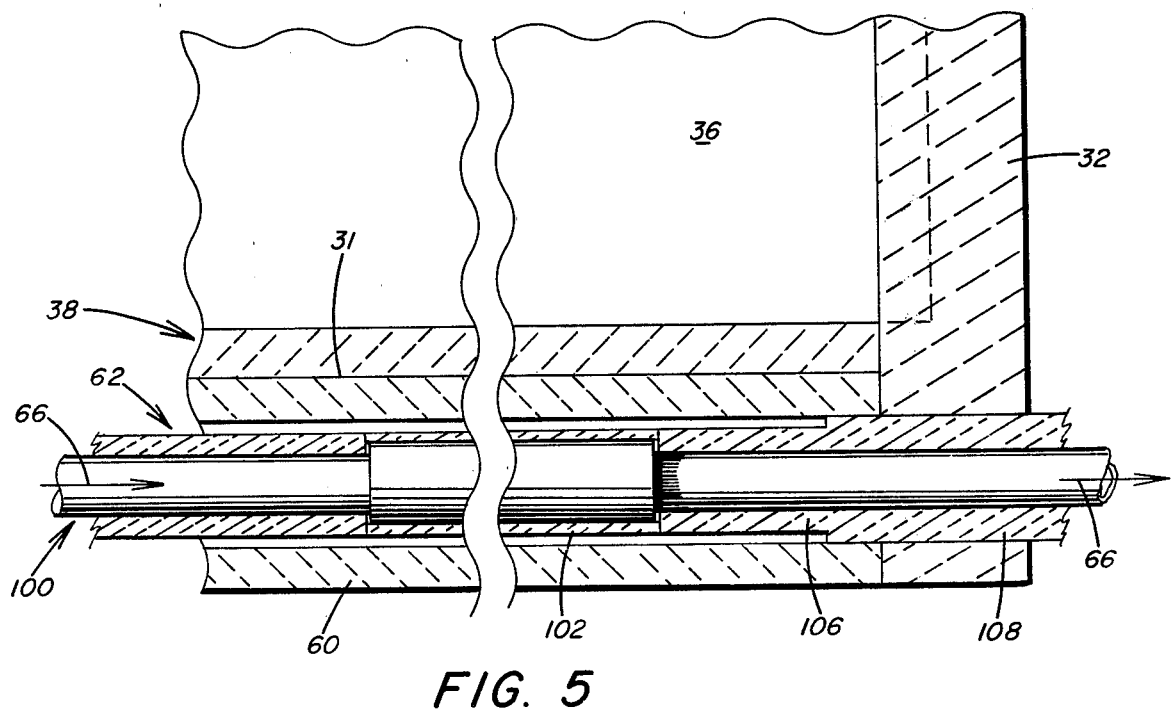
FIG. 5 is a view similar to FIG. 2 illustrating a further embodiment of the present invention.

Referring to FIG. 5, there is shown a further embodiment of the present invention, wherein a conduit 100 (similar to conduit 64 in FIG. 2) is oriented within the cavity 62, having a first thin thermal insulating sleeve 102 positioned about the larger diameter central portion; second, thicker thermal insulating sleeves 106 positioned about the smaller diameter end portions generally between the central portion and the jamb 32; and third, yet thicker insulating sleeves 108 (only one shown in FIG. 5) about the endmost portions of the conduit 100. Such an embodiment may be advantageously utilized where there is concern about the possibility of creating undesirable degrees of thermal stress within the refractory body portion 60. Such a concern may be warranted where the refractory body portion 60 is formed of materials having relatively high thermal conductivity characteristics, such as clear fused quartz. In a preferred embodiment, the insulating sleeves 102 might be formed of ⅛ inch (0.3 cm) thick ceramic fiber paper, the insulating sleeves 106 of ¼ inch (0.6 cm), and the insulating sleeves 108 of ⅜ inch (0.9 cm) thick ceramic fiber paper. Of course, it is further within the scope of the present invention to graduate the thickness of any thermal insulating sleeve from thinnest in the central portions to thickest adjacent the end portions in a smooth progressive manner.

A stream of molten glass flowing over a threshold assembly 30 commonly has a temperature in its central region of about 1900° F.–2000° F. (1038° C.–1093° C.) and a temperature adjacent its marginal edge portions of about 1835° F.–1900° F. (1000° C.–1038° C.). The molten glass is preferably maintained above its liquidus temperature throughout its delivery from the glassmaking furnace to the forming chamber. Liquidus temperatures as used herein is defined as the temperature at which devitrification occurs in the stream of molten glass. For soda-lime glass compositions commonly used in making flat glass, liquidus temperature is about 1835° F. (1000° C.). It is desirable, therefore, to practice the preferential cooling technique of the present invention such that the temperature of the marginal edge portions of the supporting surface 31 remains at a temperature in excess of the liquidus temperature, to avoid devitrification which might occur therealong. Preferably the temperature of the central portion of the supporting surface is maintained at a temperature about equal to the temperature of the marginal edge portions thereof, but the present invention is not limited thereto, as any degree of preferential threshold center cooling is desirable and within the scope of the present invention. Moreover, it may be advantageous to operate in a manner such that the temperature of the supporting surface 31 is less in its central region than at its marginal edge portions, to further diminish threshold erosion on the central portions.

Expressed in an alternative manner, threshold cooling as practiced prior to the present invention would be expected to establish an operating temperature for each region of the threshold which was a substantially equal amount less than the temperature of the glass flowing immediately over each region of the threshold. For example, with uniform threshold cooling in operation, all regions of the threshold might be caused to operate at a temperature 50 fahrenheit degrees (28 centigrade degrees) less than the temperature of the glass flowing immediately thereover. If the glass temperature in the center of the stream of molten glass was 100 fahrenheit degrees (55 centigrade degrees) greater than the glass temperature at the marginal edge portions of the stream of molten glass, the operating temperature of the central portion of the threshold would be at least about 100 fahrenheit degrees (55 centigrade degrees) greater than the operating temperature of the marginal edge portions of the threshold. For the purposes of the preceding discussion it was assumed that if cooling fluid is passed only in one direction through the threshold assembly, the marginal edge affects referred to above and hereinafter are average affects arrived at by averaging the affects at the cooling fluid inlet end with the affects at the cooling fluid outlet end. Preferably, where a plurality of conduits are disposed within the threshold assembly 30, cooling fluid is passed therethrough in opposite directions to further equalize operating temperatures.

In the practice of the present invention, the central portion of the threshold is cooled to a central portion operating temperature which is less than the central region glass temperature by an amount which exceeds the amount by which the average marginal edge portion operating temperature is less than the marginal edge portion glass temperature. Glass temperatures may be determined in any consistent manner; for example, top surface temperatures at each relevant location, or at any consistent location within the depth of the stream of molten glass. Likewise threshold operating temperatures should be determined in a consistent manner, e.g., at the supporting surface 31 or at some consistent location within the threshold assembly 30. Practice of the present invention diminishes nonuniform threshold erosion and further tends to flatten the transverse temperature profile of the stream of molten glass flowing thereover.

Although not limiting to the invention, it may be preferred that the central portion operating temperature of the supporting surface 31 be maintained substantially equal to the average marginal edge portion operating temperature thereof, or alternatively, the central portion operating temperature may be maintained below the average marginal edge portion operating temperature.

As can be appreciated, the present invention is not limited to the particular embodiments described herein, but rather, by the claims which follows.

I claim:

1. In a glassmaking process in which a stream of molten glass flows longitudinally from a melting furnace into a forming chamber over a transversely extending refractory threshold, wherein the flow of molten glass on the threshold causes the threshold to erode more rapidly at center portions than at marginal edge portions, the improvement comprising: cooling center portions of the threshold at a greater rate than marginal edge portions of the threshold are cooled so that the temperature of the center portions of the threshold is reduced relative to the temperature of the marginal edge portions to a sufficient extent to render erosion of the threshold more uniform over its entire glass contact surface.

2. The method of claim 1 wherein the center portions of the threshold are cooled to a temperature no less than the liquidus temperature of the molten glass.

3. The method of claim 1 further comprising the step of heating marginal edge portions of the threshold.

4. The method of claim 1 wherein the cooling step comprises passing cooling fluid through at least one conduit passing through the threshold in the transverse direction.

5. The method of claim 4 wherein thermal insulation is provided on the conduit in marginal edge portions of the threshold in order to reduce the cooling rate therein.

6. A structure for delivering a stream of molten glass from a melting furnace onto a pool of molten metal in a forming chamber, comprising a refractory threshold extending transversely across the path of glass flow and positioned to contact and support the molten glass stream immediately before it contacts the molten metal, cooling means in heat exchange relationship with the threshold for retarding erosion of the threshold, the heat exchange relationship having variations in the transverse direction so as to provide a greater cooling rate in center portions of the threshold than in end portions, whereby erosion of the threshold is made more uniform.

7. The apparatus of claim 6 wherein the cooling means comprises a conduit extending through the threshold in the transverse direction and in fluid communication with a source of cooling fluid.

8. The apparatus of claim 7 wherein the variations in the heat exchange relationship are established by insulation around the conduit in end portions of the threshold.

9. The apparatus of claim 6 further including means for heating end portions of the threshold.

* * * * *